United States Patent
Yamazaki

(10) Patent No.: US 6,351,606 B1
(45) Date of Patent: Feb. 26, 2002

(54) ELECTRONIC CAMERA, METHOD FOR DETECTING OBSTRUCTION TO ELECTRONIC FLASH AND METHOD FOR CORRECTING EXPOSURE LEVEL

(75) Inventor: Akihisa Yamazaki, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/544,460

(22) Filed: Apr. 7, 2000

(30) Foreign Application Priority Data

Apr. 7, 1999 (JP) ............................. 11-100546

(51) Int. Cl.[7] .................. G03B 15/02; H04N 5/235
(52) U.S. Cl. .................. 396/61; 396/155; 396/201; 396/204; 348/370; 348/362
(58) Field of Search .................. 396/61, 155, 157, 396/201, 202, 204, 205, 206, 159, 163; 348/362, 207, 370, 371, 231

(56) References Cited

U.S. PATENT DOCUMENTS 5,486,861 A * 1/1996 Miyamoto et al. .......... 348/362
5,634,152 A * 5/1997 Kato et al. .................. 396/158
5,640,628 A * 6/1997 Yoshida ..................... 396/311

FOREIGN PATENT DOCUMENTS

| JP | 7306453 | 11/1995 |
| JP | 10221761 | 8/1998 |

* cited by examiner

*Primary Examiner*—Russell Adams
*Assistant Examiner*—Arthur Smith

(57) ABSTRACT

A signal level determining block determines whether a solid-state imaging device is under-exposed in accordance with image data captured at an electronic flash shooting. The electronic flash output determining circuit determines whether an output of an electronic flash at the electronic flash shooting is at its maximum. A CPU judges that a finger of the user obstructs the electronic flash when it is determined that the solid-state imaging device is under-exposed at the electronic flash shooting and it is determined that the output of the electronic flash is not at its maximum. Then, a warning displaying part displays a warning that the finger of the user obstructs the electronic flash.

35 Claims, 5 Drawing Sheets

F I G. 1
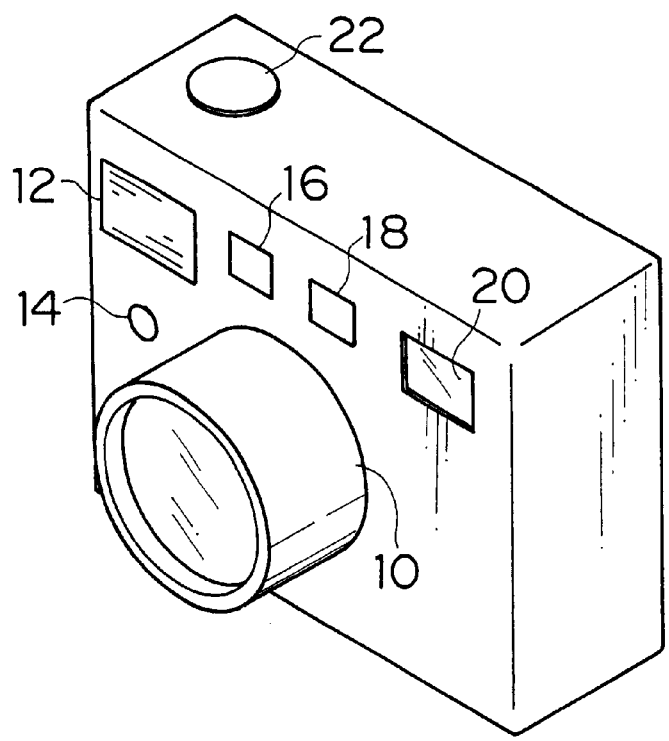
F I G. 2
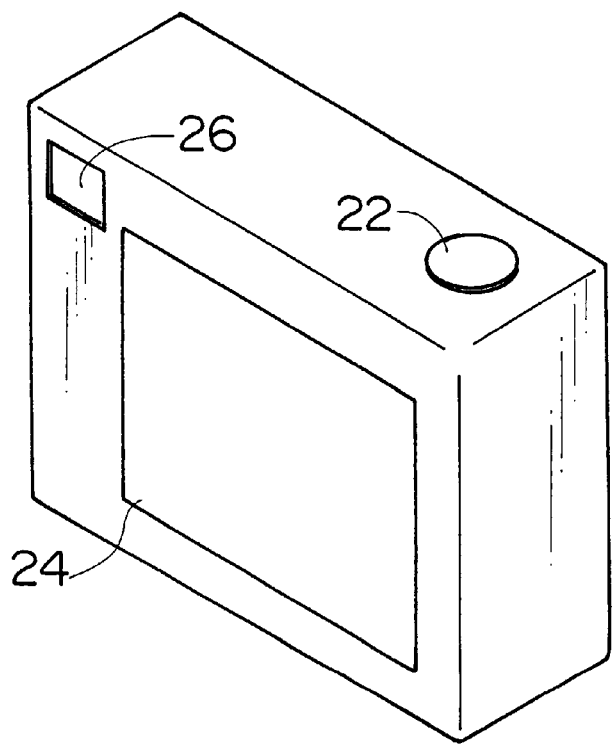

ELECTRONIC CAMERA, METHOD FOR DETECTING OBSTRUCTION TO ELECTRONIC FLASH AND METHOD FOR CORRECTING EXPOSURE LEVEL

BACKGROUND OF THE INVENTION

1. Field of the Invention

The present invention generally relates to an electronic camera, and more particularly to an electronic camera that warns of an obstruction to an automatic electronic flash, a method for detecting the obstruction and a method for correcting an exposure level.

2. Description of Related Art

An electronic camera has been reduced in size in recent years, and a finger of the user is apt to obstruct a built-in electronic flash when the user points the camera at a subject.

To address this problem, Japanese Patent Provisional Publication No. 7-306453 discloses a camera that has an obstruction sensor measuring the capacitance of a capacitor arranged beside the electronic flash and warns the user of the obstruction in accordance with the change of the capacitance. Also, Japanese Patent Provisional Publication No. 10-221761 discloses a camera, in which the more important members are, the farther the members are arranged from the fingers of the user, to minimize the bad effect when the finger obstructs the members.

When the finger obstructs a window of an automatic electronic flash, the finger reflects the flash and the reflected light enters an electronic flash adjusting sensor. Accordingly, the electronic flash quickly adjusts the flash, and an imaging device is under-exposed as a result.

When the camera has the obstruction sensor, however, a space for the obstruction sensor is required and thus the camera becomes larger and its cost is increased. On the other hand, if only the electronic flash adjusting sensor is arranged far from the electronic flash window, the camera can not warn the user of the obstruction, moreover, circuits are not appropriately constructed for reducing the size of the camera since the electronic flash adjusting sensor is far from an electronic flash circuit and wires are long.

SUMMARY OF THE INVENTION

The present invention has been developed in view of the above-described circumstances, and has as its object the provision of an electronic camera that can detect an obstruction to an electronic flash and warn of the obstruction without a special obstruction sensor, and a method for detecting the obstruction.

The present invention has as another object the provision of an electronic camera that can warn that a flash does not reach a subject or correct the exposure level when the flash does not reach the subject, and an exposure level correcting method.

To achieve the above-described object, the present invention is directed to an electronic camera which records image data of a subject captured through a taking lens and an imaging device into a recording medium, the electronic camera comprising: an electronic flash; a first determining device which determines whether the imaging device is under-exposed in accordance with the image data captured at an electronic flash shooting; a second determining device which determines whether an output of the electronic flash is at a maximum thereof; a judging device which judges, when the first determining device determines that the imaging device is under-exposed at the electronic flash shooting and the second determining device determines that the output of the electronic flash is not at its maximum, that the electronic flash is obstructed; and a warning device which warns that the electronic flash is obstructed when the judging device judges that the electronic flash is obstructed.

According to the present invention, it is judged that the electronic flash is obstructed when the under-exposure is detected and it is determined that the output of the electronic flash is not at its maximum (the emission is stopped before reaching its maximum) in accordance with the image data captured at the electronic flash shooting. When the electronic flash is obstructed by an obstruction (e.g., a finger of the user), the obstruction reflects the flash and the reflected light enters an electronic flash adjusting sensor. Accordingly, the electronic flash is quickly stopped, and the output of the electronic flash is thereby small and the imaging device is underexposed as a result. In this case, there is a warning that the electronic flash is obstructed.

Preferably, the second determining device determines whether the output of the electronic flash is at the maximum thereof in accordance with at least one of an emission time of the electronic flash and a change in voltage of a capacitor powering the electronic flash between before and after the electronic flash shooting.

To achieve the above-described object, the present invention is directed to an electronic camera which records image data of a subject captured through a taking lens and an imaging device into a recording medium, the electronic camera comprising: an electronic flash; a first determining device which determines whether the imaging device is under-exposed in accordance with the image data captured at an electronic flash shooting; a second determining device which determines whether an output of the electronic flash is at a maximum thereof; a judging device which judges, when the first determining device determines that the imaging device is under-exposed at the electronic flash shooting and the second determining device determines that the output of the electronic flash is at its maximum, that a flash of the electronic flash does not reach the subject; and a correction device which corrects, when the judging device judges that the flash does not reach the subject, an exposure level of the image data captured at the electronic flash shooting and then records the image data in the recording medium.

According to the present invention, it is judged that the flash does not reach the subject when the under-exposure is detected and it is determined that the output of the electronic flash is at its maximum in accordance with the image data acquired at the electronic flash shooting. When it is judged that the flash does not reach the subject, the exposure level of the image data captured at the electronic flash shooting is corrected (raised in gain) and then the corrected image data is recorded in the recording medium. The warning device may warn that the flash does not reach the subject.

To achieve the above-described object, the present invention is directed to an electronic camera which records image data of a subject captured through a taking lens and an imaging device into a recording medium, the electronic camera comprising: an electronic flash; a first determining device which determines whether the imaging device is under-exposed in accordance with the image data captured at an electronic flash shooting; a second determining device which determines whether an output of the electronic flash is at a maximum thereof; a first judging device which judges, when the first determining device determines that the imaging device is under-exposed at the electronic flash shooting and the second determining device determines that the output of the electronic flash is not at its maximum, that the electronic flash is obstructed; a second judging device which judges, when the first determining device determines that the imaging device is under-exposed at the electronic flash shooting and the second determining device determines that the output of the electronic flash is at its maximum, that a flash of the electronic flash does not reach the subject; and a warning device which warns that the electronic flash is obstructed when the first judging device judges that the electronic flash is obstructed and which warns that the flash does not reach the subject when the second judging device judges that the flash does not reach the subject.

To achieve the above-described object, the present invention is directed to an electronic camera which records image data of a subject captured through a taking lens and an imaging device into a recording medium, the electronic camera comprising: an electronic flash; a first determining device which determines whether the imaging device is under-exposed in accordance with the image data captured at an electronic flash shooting; a second determining device which determines whether an output of the electronic flash is at a maximum thereof; a first judging device which judges, when the first determining device determines that the imaging device is under-exposed at the electronic flash shooting and the second determining device determines that the output of the electronic flash is not at its maximum, that the electronic flash is obstructed; a second judging device which judges, when the first determining device determines that the imaging device is under-exposed at the electronic flash shooting and the second determining device determines that the output of the electronic flash is at its maximum, that a flash of the electronic flash does not reach the subject; a warning device which warns that the electronic flash is obstructed when the first judging device judges that the electronic flash is obstructed; and a correction device which corrects, when the second judging device judges that the flash does not reach the subject, an exposure level of the image data captured at the electronic flash shooting and then records the image data in the recording medium.

To achieve the above-described object, the present invention is directed to an electronic camera which records image data of a subject captured through a taking lens and an imaging device into a recording medium, the electronic camera comprising: an electronic flash; a first determining device which determines whether the imaging device is under-exposed in accordance with the image data captured at an electronic flash shooting; a rangefinder which measures a subject distance; a second determining device which determines whether the subject distance measured by the rangefinder at the electronic flash shooting is at most a predetermined reach of flash; a judging device which judges, when the first determining device determines that the imaging device is under-exposed at the electronic flash shooting and the second determining device determines that the subject distance is at most the predetermined reach of flash, that the electronic flash is obstructed; and a warning device which warns that the electronic flash is obstructed when the judging device judges that the electronic flash is obstructed.

To achieve the above-described object, the present invention is directed to a method for detecting an obstruction to an electronic flash of an electronic camera which records image data of a subject captured through a taking lens and an imaging device into a recording medium, the method comprising the steps of: determining whether the imaging device is under-exposed in accordance with the image data captured at an electronic flash shooting and determining whether an output of the electronic flash is at a maximum thereof; and judging that the electronic flash is obstructed when it is determined that the imaging device is under-exposed at the electronic flash shooting and it is determined that the output of the electronic flash is not at the maximum thereof in the determining step.

Preferably, the determining step comprises, to determine whether the output of the electronic flash is at the maximum thereof, at least one of the steps of: determining an emission time of the electronic flash; and determining a change in voltage of a capacitor powering the electronic flash between before and after the electronic flash shooting.

To achieve the above-described object, the present invention is directed to an exposure level correcting method in an electronic camera which records image data of a subject captured through a taking lens and an imaging device into a recording medium, the exposure level correcting method comprising the steps of: determining whether the imaging device is under-exposed in accordance with the image data captured at an electronic flash shooting and determining whether an output of the electronic flash is at a maximum thereof; and judging that a flash of the electronic flash does not reach and correcting an exposure level of the image data captured at the electronic flash shooting when it is determined that the imaging device is under-exposed at the electronic flash shooting and it is determined that the output of the electronic flash is at the maximum thereof in the determining step.

To achieve the above-described object, the present invention is directed to a method for detecting an obstruction to an electronic flash of an electronic camera which records image data of a subject captured through a taking lens and an imaging device into a recording medium, the method comprising the steps of: determining whether the imaging device is under-exposed in accordance with the image data captured at an electronic flash shooting, measuring a subject distance, and determining whether the subject distance is at most a predetermined reach of flash; and judging that the electronic flash is obstructed when it is determined that the imaging device is under-exposed at the electronic flash shooting and it is determined that the subject distance is at most the predetermined reach of flash.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 1 is a perspective front view showing an electronic camera according to the present invention;

FIG. 2 is a perspective back view showing the electronic camera according to the present invention;

FIG. 4 is a flow chart showing a first embodiment of the procedure for warning that a finger of a user obstructs an electronic flash, and so on;

FIG. 5 is a flow chart showing a second embodiment of the procedure for warning that the finger of the user obstructs the electronic flash, and so on; and FIG. 6 is a flow chart showing a third embodiment of the procedure for warning that the finger of the user obstructs the electronic flash, and so on.

DETAILED DESCRIPTION OF THE PREFERRED EMBODIMENT

Figure 3:
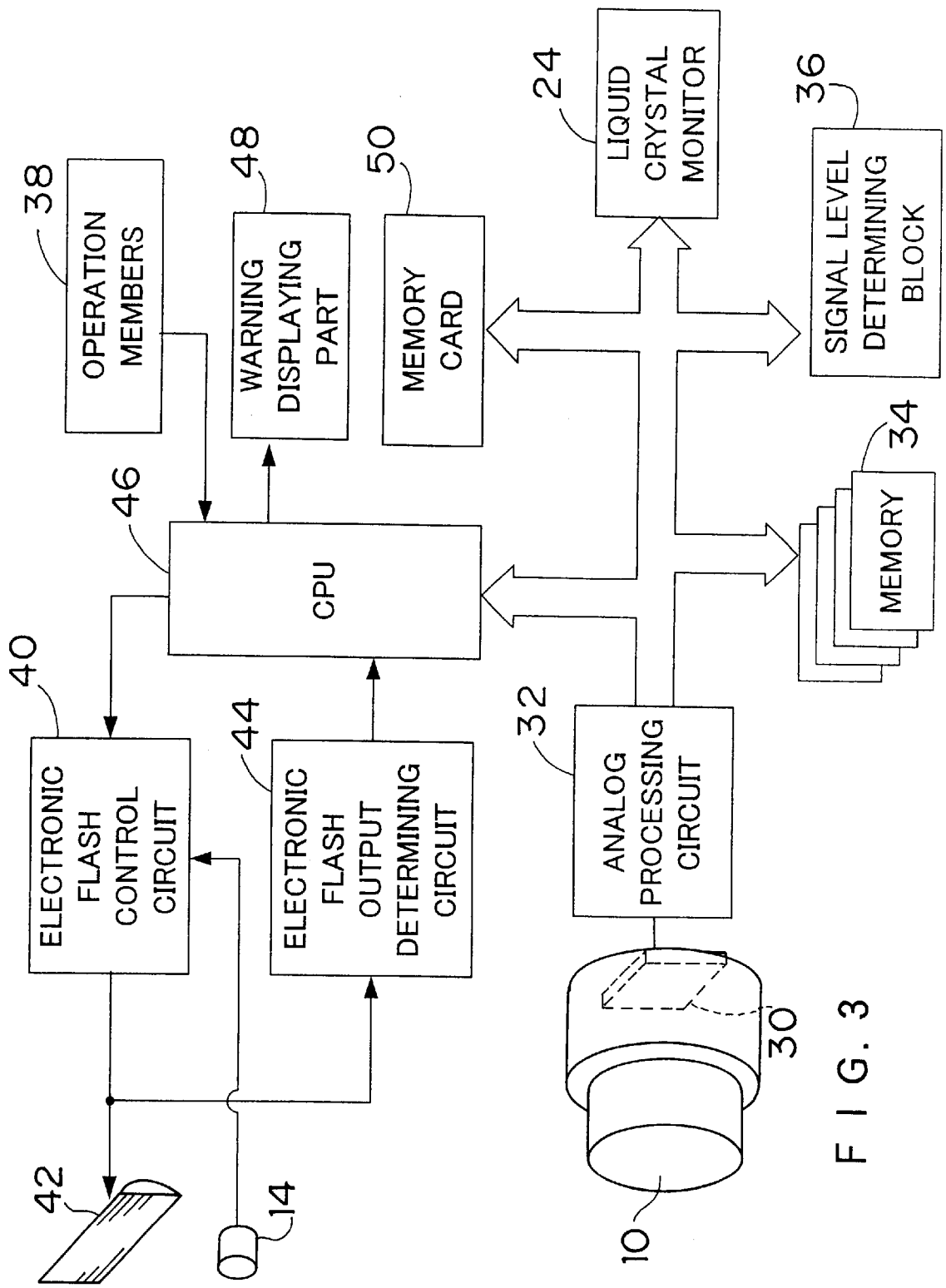
FIG. 3 is a block diagram showing the structure of the electronic camera shown in FIGS. 1 and 2.

Hereunder the preferred embodiments of the present invention are explained in detail according to the accompanying drawings.

FIGS. 1 and 2 are a front perspective view and a back perspective view, respectively, showing the exterior of an electronic camera according to an embodiment of the present invention.

As shown in FIG. 1, a taking lens 10, an electronic flash window 12, an electronic flash adjusting sensor 14, an autofocus (AF) light-emitting window 16, an AF light-receiving window 18 and an objective window 20 of an optical finder are provided on the front of the camera, and a shutter release switch 22 is provided on the top of the camera. As shown in FIG. 2, an image displaying device or a liquid crystal monitor 24 and an eyepiece 26 of the optical finder is provided on the back of the camera.

FIG. 3 is a block diagram showing the structure of the electronic camera shown in FIGS. 1 and 2.

As shown in FIG. 3, the electronic camera comprises the taking lens 10, a solid-state imaging device 30 such as a charge coupled device (CCD), an analog processing circuit 32, a memory 34, a signal level determining block 36, the liquid crystal monitor 24, operation members 38 such as the shutter release switch 22, an electronic flash control circuit 40, an automatic electronic flash device including an electronic flash output part 42 and the electronic flash adjusting sensor 14, an electronic flash output determining circuit 44 and a central processing unit (CPU) 46.

An image light of a subject is formed on a light-receiving surface of the solid-state imaging device 30 through the taking lens 10 and is converted into signal electric charges corresponding to amounts of the image light. The photoelectrically-converted signal electric charges are successively transmitted in accordance with drive pulses sent from a CCD drive circuit (not shown) and are read as voltage signals (image signals) corresponding to the signal electric charges.

The image signals read from the solid-state imaging device 30 are sent to the analog processing circuit 32, in which sampling/hold, color separation and A/D conversion are performed. The A/D-converted image data is stored in the memory 34 by the CPU 46. The image data stored in the memory when the shutter release switch 22 is half pressed (or when a moving-image is shot) is sent to the liquid crystal monitor 24, which displays the image of the subject as a real-time moving-image or a substantially successive moving-image that is not real-time. Thus, the user can determine the composition of a still image of the subject while looking at the displayed image on the liquid crystal monitor 24. The liquid crystal monitor 24 can be turned ON/OFF by operating a display switch of the operation members 38. When the liquid crystal monitor 24 is OFF, the user determines the composition of the still image of the subject by means of the optical finder.

The electronic camera has a rangefinder that receives infrared rays emitted from the AF light-emitting window 16 through the AF light-receiving window 18 to measure a subject distance in accordance with a position where the infrared rays are received, and a photometer (not shown) that measures a brightness of the subject. Alternatively, the subject distance may be measured, for example, on the basis of the position of a focus lens when the camera is focused by the contrast detecting method with the image signals.

The automatic electronic flash device emits a desired flash to shoot the subject with a correct exposure when the luminance of the subject measured by the photometer is low or the subject is backlighted. If the shutter release switch 22 is fully pressed when the luminance of the subject measured by the photometer is low or the subject is backlighted, the CPU 46 outputs an emitting command to the electronic flash control circuit 40. When the emitting command is sent to the electronic flash control circuit 40, the electronic flash control circuit 40 outputs an emission start signal to the electronic flash output part 42, which starts emitting the flash. The electronic flash adjusting sensor 14 receives an electronic flash reflected light and outputs an signal corresponding to the amount of the reflected light to the electronic flash control circuit 40. When the electronic flash control circuit 40 detects that the electronic flash adjusting sensor 14 receives a predetermined amount of the reflected light on the basis of the signal from the electronic flash adjusting sensor 14, the electronic flash control circuit 40 outputs an emission stop signal to the electronic flash output part 42, which stops emitting the flash.

The electronic flash output determining circuit 44 measures the time from when the emission start signal is outputted from the electronic flash control circuit 40 until when the emission stop signal is outputted from the electronic flash control circuit 40, and determines the output of the electronic flash on the basis of the measured time. Then, the electronic flash output determining circuit 44 determines whether the output of the electronic flash is at its maximum (whether the electronic flash fully emits the flash) on the basis of the determined output of the electronic flash, and outputs a signal showing whether the electronic flash fully emits the flash to the CPU 46.

Alternatively, the output of the electronic flash may be also determined by measuring the change of the voltage of a main capacitor of the electronic flash. An electric energy U used for the emission is described by the following equation (1):

$$U = C(V_1^2 - V_2^2)/2, \qquad (1)$$

where C is the capacitance of the main capacitor, and $V_1$ is the voltage of the main capacitor before the start of the emission, and $V_2$ is the voltage of the main capacitor after the start of the emission. Accordingly, the output of the electronic flash can be determined from the voltages $V_1$ and $V_2$, and thus whether the electronic flash fully emits the flash can be determined.

When the shutter release switch 22 is fully pressed after the composition of the image of the subject is determined, the image is shot after the exposure for the brightness of the subject and the AF is performed. The image signals read from the solid-state imaging device 30 are temporary stored in the memory as R, G and B image data for one frame. Then, when an image is shot without the electronic flash, the R, G and B image data are converted into YC signals (luminance signals Y and chroma signals C), which are recorded in a recording medium or a memory card 50 after being compressed in a predetermined format such as Joint Photographic Experts Group (JPEG).

On the other hand, when the luminance of the subject is low or the subject is backlighted, the image is shot with the electronic flash. In this case, the image data are stored in the memory 34 and sent to the signal level determining block 36. The signal level determining block 36 determines the signal levels of all or a part (e.g., the center part of the image where the main subject is apt to be) of the image data for one frame, and determines whether the brightness of the shot image is correct (whether the solid-state imaging device 30 is adequately exposed) on the basis of the determined signal levels.

The explanation will now be given of the way for detecting that a finger of the user obstructs the electronic flash and that the flash does not reach the subject in accordance with whether the solid-state imaging device 30 is under-exposed as determined by the signal level determining block 36 and whether the electronic flash fully emits the flash determined by the electronic flash output determining circuit 44 when the image is shot with the electronic flash.

Figure 4:
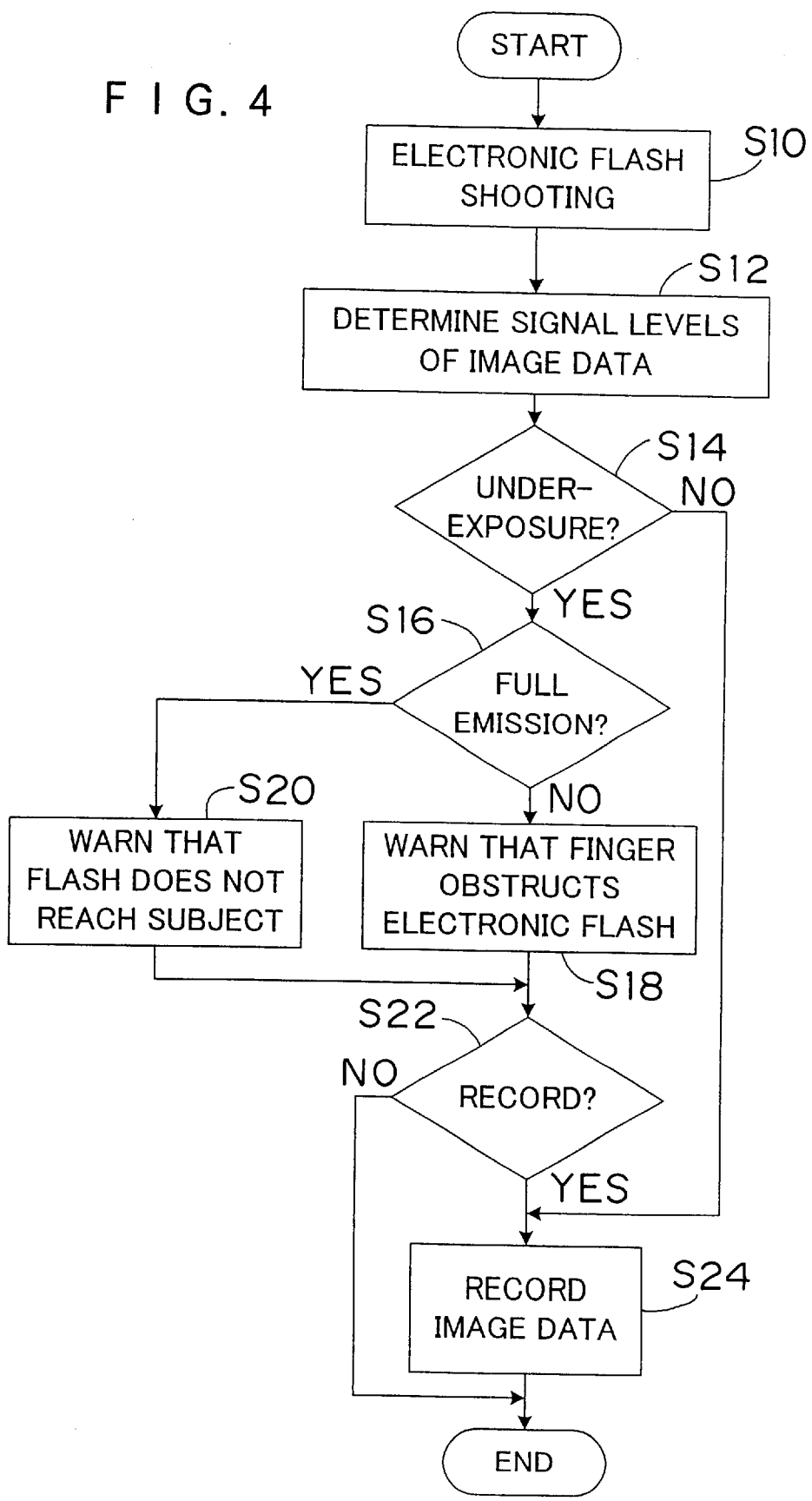

FIG. 4 is a flow chart showing a first embodiment of the procedure for warning that the finger of the user obstructs the electronic flash, and so on. As shown in FIG. 4, when the image is shot with the electronic flash (step S10), the signal level determining block 36 determines the signal levels of the image data (step S12) and then determines whether the solid-state imaging device 30 is under-exposed (step S14).

If it is determined that the solid-state imaging device 30 is not under-exposed (i.e., the solid-state imaging device 30 is adequately exposed), the image data stored in the memory 34 are recorded in the memory card 50 (step S24).

On the other hand, if it is determined that the solid-state imaging device 30 is under-exposed, whether the electronic flash fully emits the flash is determined (step S16). In the shooting with the automatic electronic flash, the signal levels determined by the signal level determining block 36 are substantially the same since the electronic flash stops emitting the flash when the signal level determining block 36 determines that the amount of the flash light that is reflected by the subject reaches the predetermined amount. Accordingly, when the under-exposure is detected at the electronic flash shooting, it is judged that the finger of the user obstructs the electronic flash or the flash does not reach the subject. If it is determined that the electronic flash does not fully emit the flash at the step S16 in spite of the under-exposure, it is judged that the finger of the user obstructs the electronic flash and a warning displaying part 48 (see FIG. 3) displays a warning of the obstruction to the electronic flash (step S18).

If it is determined that the electronic flash fully emits the flash at the step S16 when the solid-state imaging device 30 is under-exposed, it is judged that the flash does not reach the subject and the warning displaying part 48 displays a warning that the flash does not reach the subject (step S20).

Then, whether to record the image data that is stored in the memory 34 when the finger of the user obstructs the electronic flash or the flash does not reach the subject into the memory card 50 is determined (step S22). For example, the liquid crystal display 24 displays the message "RECORD? (Y/N)", and the user chooses "YES" or "NO". If the user chooses "YES", the image data is recorded in the memory card 50 (step S24). If the user chooses "NO", the image data is not recorded in the memory card 50 and the process ends.

Figure 5:
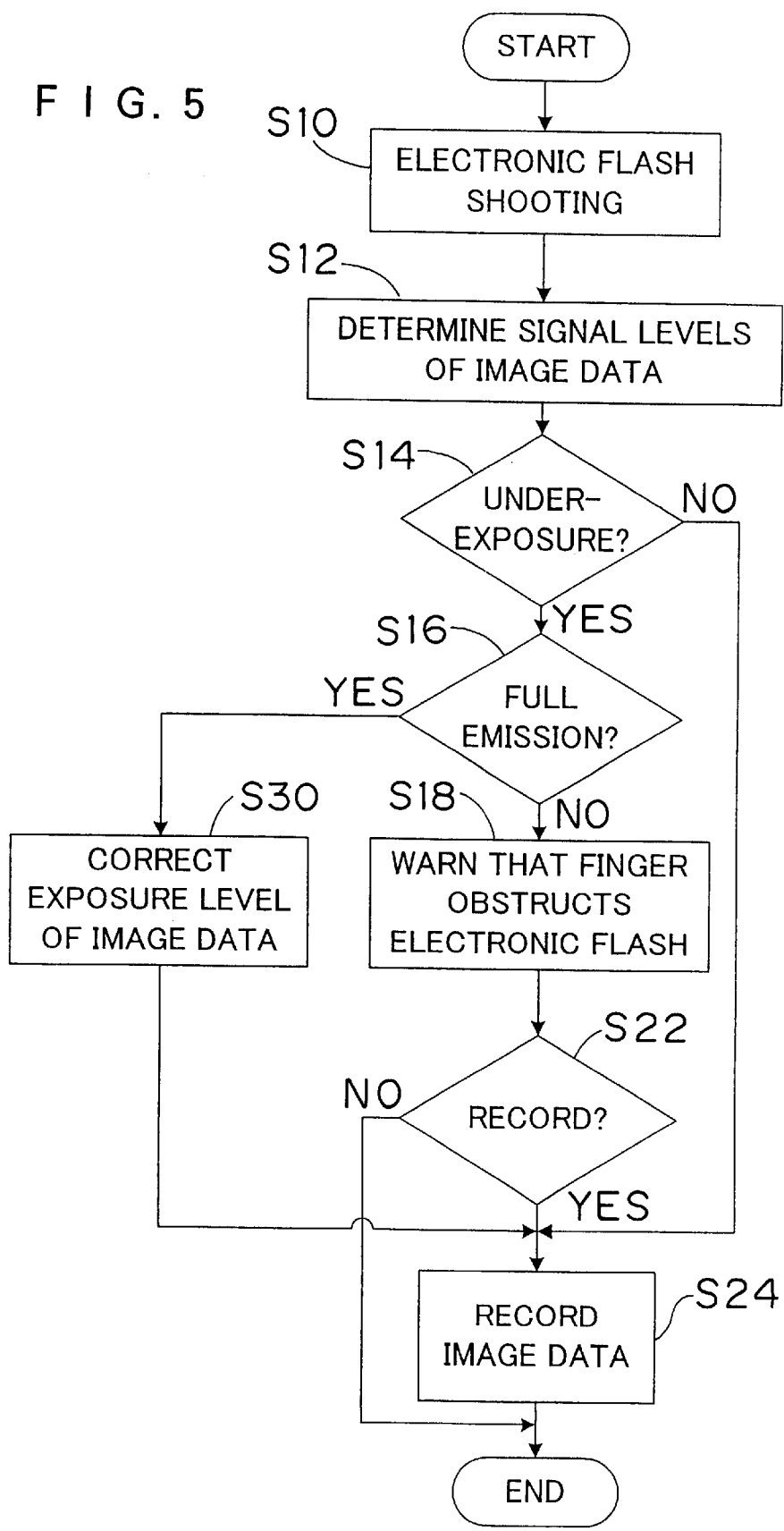

FIG. 5 is a flow chart showing a second embodiment of the procedure for warning that the finger of the user obstructs the electronic flash, and so on. Steps that are the same as those in FIG. 4 are denoted by the same numerals and they will not be explained.

The second embodiment is different from the first embodiment in that it has a step S30 in stead of the step S20 in FIG. 4. When it is determined that the flash does not reach the subject, the exposure level of the image data stored in the memory 34 is modified to be correct digital data by a digital gain controller or the like (step S30). Then, the image data whose exposure level has been corrected is recorded in the memory card 50 (step S24).

In the first and second embodiments, the automatic electronic flash with the electronic flash adjusting sensor 14 warns that the finger of the user obstructs the electronic flash. The method for detecting that the finger of the user obstructs the electronic flash, and so on in case that the subject distance is measured will be explained.

Figure 6:
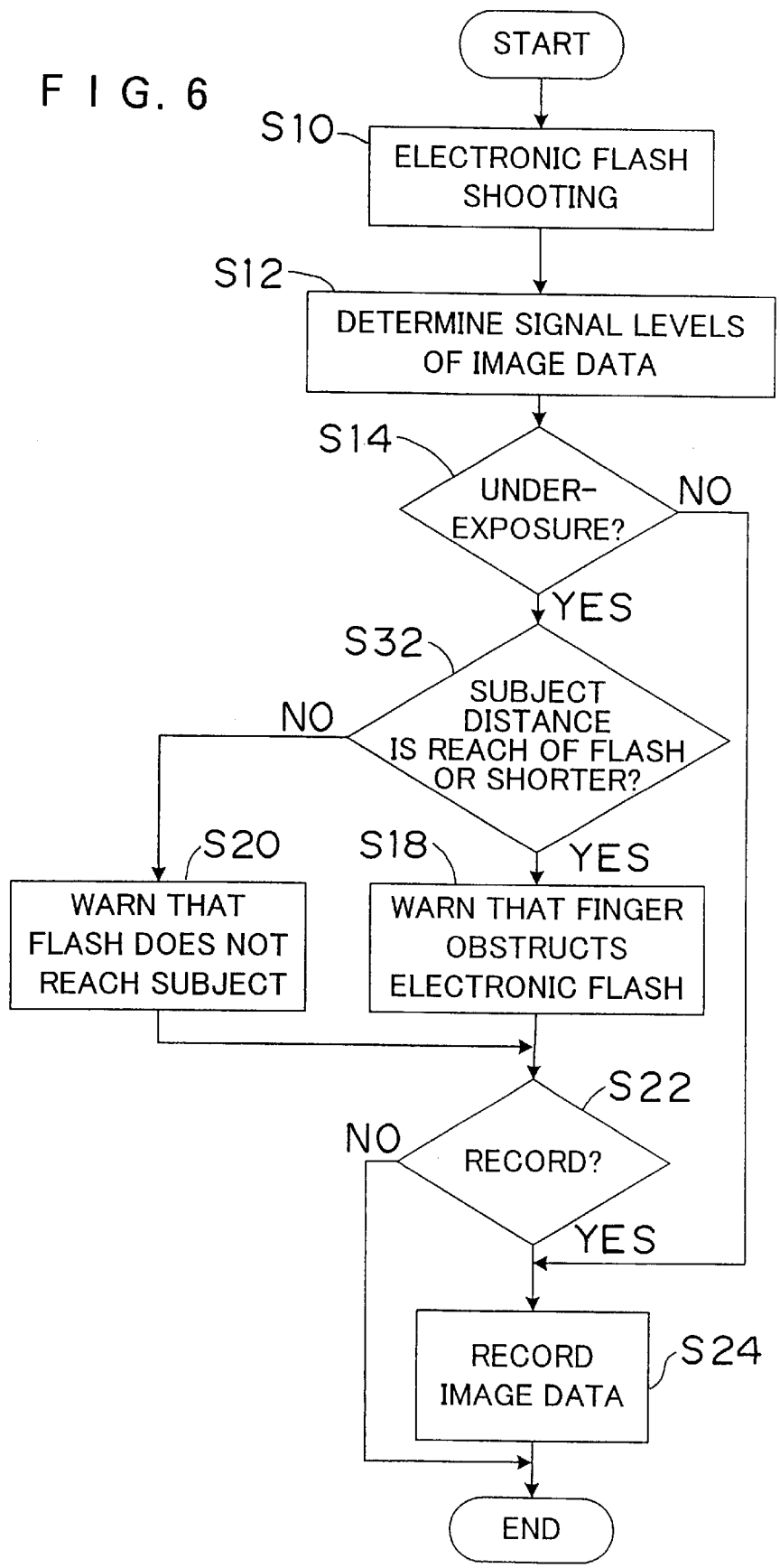

FIG. 6 is a flow chart showing a third embodiment of the procedure for warning that the finger of the user obstructs the electronic flash, and so on. Steps that are the same as those in FIG. 4 are denoted by the same numerals and they will not be explained.

The third embodiment is different from the first embodiment in that it has a step S32 in stead of the step S16 in FIG. 4. When the under-exposure is detected at the step S14, whether the subject distance measured by the rangefinder is at most a reach of flash (step S32). This embodiment is not restricted to that whether the solid-state imaging device 30 is under-exposed is determined at the step S14 on the basis of the image data captured when the electronic flash emits the flash, and it may be determined on the basis of image data captured at a preliminary emission of the electronic flash.

The reach of flash L is described by the following equation (2):

$$L = (G_{No.})/(F_{No.}), \qquad (2)$$

where $F_{No.}$ is the f-number of the open aperture and $G_{No.}$ is the guide number of the electronic flash. Accordingly, whether the subject distance is at most the reach of flash can be determined after the subject distance is measured.

If it is determined that the subject distance is at most the reach of flash at the step S32 when the solid-state imaging device 30 is under-exposed, it is judged that the finger of the user obstructs the electronic flash and the warning displaying part 48 displays the warning of the obstruction to the electronic flash (step S18).

If it is determined that the subject distance is longer than the reach of flash at the step S32, the warning displaying part 48 displays the warning that the flash does not reach the subject (step S20). Alternatively, the exposure level of the image data may be corrected and then the corrected image data may be recorded in the memory card 50 as shown in FIG. 5 (i.e., the step S30 may be performed instead of the step S20), if it is judged that the flash does not reach the subject at the step S16.

In the above-described embodiments, the warning displaying part 48 displays the warning that the finger of the user obstructs the electronic flash and the warning that the flash does not reach the subject. The present invention, however, should not be restricted to this; and the warnings may be displayed on an image displaying device such as the liquid crystal monitor 24.

As explained above, according to the present invention, it is detected that the finger of the user obstructs the electronic flash and it is detected that the flash does not reach the subject in accordance with the exposure condition determined on the basis of the image data captured at the electronic flash shooting and the output of the electronic flash or the subject distance. Thus, it is possible to warn that the finger of the user obstructs the electronic flash and warn that the flash does not reach the subject without a special obstruction sensor. Moreover, if the flash does not reach the subject, the exposure level of the image data is corrected and the corrected image data is thus recorded.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An electronic camera which records image data of a subject captured through a taking lens and an imaging device into a recording medium, the electronic camera comprising:

an electronic flash;

a first determining device which determines whether the imaging device is under-exposed in accordance with the image data captured at an electronic flash shooting;

a second determining device which determines whether an output of the electronic flash is at a maximum thereof;

a judging device which judges, when the first determining device determines that the imaging device is under-exposed at the electronic flash shooting and the second determining device determines that the output of the electronic flash is not at its maximum, that the electronic flash is obstructed; and a warning device which warns that the electronic flash is obstructed when the judging device judges that the electronic flash is obstructed.

2. The electronic camera as defined in claim 1, wherein the second determining device determines whether the output of the electronic flash is at the maximum thereof in accordance with at least one of an emission time of the electronic flash and a change in voltage of a capacitor powering the electronic flash between before and after the electronic flash shooting.

3. An electronic camera which records image data of a subject captured through a taking lens and an imaging device into a recording medium, the electronic camera comprising:

an electronic flash;

a first determining device which determines whether the imaging device is under-exposed in accordance with the image data captured at an electronic flash shooting;

a second determining device which determines whether an output of the electronic flash is at a maximum thereof;

a judging device which judges, when the first determining device determines that the imaging device is under-exposed at the electronic flash shooting and the second determining device determines that the output of the electronic flash is at its maximum, that a flash of the electronic flash does not reach the subject; and a correction device which corrects, when the judging device judges that the flash does not reach the subject, an exposure level of the image data captured at the electronic flash shooting and then records the image data in the recording medium.

4. The electronic camera as defined in claim 3, wherein the second determining device determines whether the output of the electronic flash is at the maximum thereof in accordance with at least one of an emission time of the electronic flash and a change in voltage of a capacitor powering the electronic flash between before and after the electronic flash shooting.

5. An electronic camera which records image data of a subject captured through a taking lens and an imaging device into a recording medium, the electronic camera comprising:

an electronic flash;

a first determining device which determines whether the imaging device is under-exposed in accordance with the image data captured at an electronic flash shooting;

a second determining device which determines whether an output of the electronic flash is at a maximum thereof;

a first judging device which judges, when the first determining device determines that the imaging device is under-exposed at the electronic flash shooting and the second determining device determines that the output of the electronic flash is not at its maximum, that the electronic flash is obstructed;

a second judging device which judges, when the first determining device determines that the imaging device is under-exposed at the electronic flash shooting and the second determining device determines that the output of the electronic flash is at its maximum, that a flash of the electronic flash does not reach the subject; and a warning device which warns that the electronic flash is obstructed when the first judging device judges that the electronic flash is obstructed and which warns that the flash does not reach the subject when the second judging device judges that the flash does not reach the subject.

6. The electronic camera as defined in claim 5, wherein the second determining device determines whether the output of the electronic flash is at the maximum thereof in accordance with at least one of an emission time of the electronic flash and a change in voltage of a capacitor powering the electronic flash between before and after the electronic flash shooting.

7. An electronic camera which records image data of a subject captured through a taking lens and an imaging device into a recording medium, the electronic camera comprising:

an electronic flash;

a first determining device which determines whether the imaging device is under-exposed in accordance with the image data captured at an electronic flash shooting;

a second determining device which determines whether an output of the electronic flash is at a maximum thereof;

a first judging device which judges, when the first determining device determines that the imaging device is under-exposed at the electronic flash shooting and the second determining device determines that the output of the electronic flash is not at its maximum, that the electronic flash is obstructed;

a second judging device which judges, when the first determining device determines that the imaging device is under-exposed at the electronic flash shooting and the second determining device determines that the output of the electronic flash is at its maximum, that a flash of the electronic flash does not reach the subject;

a warning device which warns that the electronic flash is obstructed when the first judging device judges that the electronic flash is obstructed; and a correction device which corrects, when the second judging device judges that the flash does not reach the subject, an exposure level of the image data captured at the electronic flash shooting and then records the image data in the recording medium.

8. The electronic camera as defined in claim 7, wherein the second determining device determines whether the output of the electronic flash is at the maximum thereof in accordance with at least one of an emission time of the electronic flash and a change in voltage of a capacitor powering the electronic flash between before and after the electronic flash shooting.

9. An electronic camera which records image data of a subject captured through a taking lens and an imaging device into a recording medium, the electronic camera comprising:

an electronic flash;

a first determining device which determines whether the imaging device is under-exposed in accordance with the image data captured at an electronic flash shooting;

a rangefinder which measures a subject distance;

a second determining device which determines whether the subject distance measured by the rangefinder at the electronic flash shooting is at most a predetermined reach of flash;

a judging device which judges, when the first determining device determines that the imaging device is under-exposed at the electronic flash shooting and the second determining device determines that the subject distance is at most the predetermined reach of flash, that the electronic flash is obstructed; and a warning device which warns that the electronic flash is obstructed when the judging device judges that the electronic flash is obstructed.

10. A method for detecting an obstruction to an electronic flash of an electronic camera which records image data of a subject captured through a taking lens and an imaging device into a recording medium, the method comprising the steps of:

determining whether the imaging device is under-exposed in accordance with the image data captured at an electronic flash shooting and determining whether an output of the electronic flash is at a maximum thereof; and judging that the electronic flash is obstructed when it is determined that the imaging device is under-exposed at the electronic flash shooting and it is determined that the output of the electronic flash is not at the maximum thereof in the determining step.

11. The method as defined in claim 10, wherein the determining step comprises, to determine whether the output of the electronic flash is at the maximum thereof, at least one of the steps of:

determining an emission time of the electronic flash; and determining a change in voltage of a capacitor powering the electronic flash between before and after the electronic flash shooting.

12. An exposure level correcting method in an electronic camera which records image data of a subject captured through a taking lens and an imaging device into a recording medium, the exposure level correcting method comprising the steps of:

determining whether the imaging device is under-exposed in accordance with the image data captured at an electronic flash shooting and determining whether an output of the electronic flash is at a maximum thereof; and judging that a flash of the electronic flash does not reach and correcting an exposure level of the image data captured at the electronic flash shooting when it is determined that the imaging device is under-exposed at the electronic flash shooting and it is determined that the output of the electronic flash is at the maximum thereof in the determining step.

13. The method as defined in claim 12, wherein the determining step comprises, to determine whether the output of the electronic flash is at the maximum thereof, at least one of the steps of:

determining an emission time of the electronic flash; and determining a change in voltage of a capacitor powering the electronic flash between before and after the electronic flash shooting.

14. A method for detecting an obstruction to an electronic flash of an electronic camera which records image data of a subject captured through a taking lens and an imaging device into a recording medium, the method comprising the steps of:

determining whether the imaging device is under-exposed in accordance with the image data captured at an electronic flash shooting, measuring a subject distance, and determining whether the subject distance is at most a predetermined reach of flash; and judging that the electronic flash is obstructed when it is determined that the imaging device is under-exposed at the electronic flash shooting and it is determined that the subject distance is at most the predetermined reach of flash.

15. An electronic camera recording image data associated with an image of a subject captured through a taking lens and an imaging device into a recording medium, the electronic camera comprising:

a first device configured to determine whether the image is under-exposed in accordance with the image data captured at a shooting of an electronic flash;

a second device configured to determine whether an output of the electronic flash is at a maximum level; and a third device configured to determine that the electronic flash is obstructed when the first device determines that the imaging device is under-exposed and the second device determines that the output of the electronic flash is not at its maximum.

16. The electronic camera according to claim 15, wherein the second device determines whether the output of the electronic flash is at the maximum in accordance with at least one of: an emission time of the electronic flash, and a change in voltage of a capacitor powering the electronic flash, the change in voltage determined between a first time instant before the electronic flash shooting and a second time instant after the electronic flash shooting.

17. The electronic camera according to claim 15, further comprising a warning device providing a warning that the electronic flash is obstructed responsive to the third device.

18. An electronic camera recording image data associated with an image of a subject captured through a taking lens and an imaging device into a recording medium, the electronic camera comprising:

a first device configured to determine whether the image is under-exposed in accordance with the image data captured at a shooting of an electronic flash;

a second device configured to determine whether an output of the electronic flash is at a maximum thereof; and a third device configured to determine that a flash of the electronic flash does not reach the subject responsive to the first determining device determining that the image is under-exposed and the second determining device determining that the output of the electronic flash is at its maximum.

19. The electronic camera according to claim 18, wherein the second device determines whether the output of the electronic flash is at the maximum in accordance with at least one of: an emission time of the electronic flash and a change in voltage of a capacitor powering the electronic flash, the change in voltage determined between a first instant before the electronic flash shooting and a second instant after the electronic flash shooting.

20. The electronic camera according to claim 18, further comprising a correction device configured to correct an exposure level of the image data captured at the electronic flash shooting when the third device determines that the flash does not reach the subject, wherein the image data is recorded in the recording medium after the exposure level is corrected.

21. An electronic camera recording image data associated with an image of a subject captured through a taking lens and an imaging device into a recording medium, the electronic camera comprising:
  a first device configured to determine whether the image is under-exposed in accordance with the image data captured at a shooting of an electronic flash;
  a second device configured to determine whether an output of the electronic flash is at a maximum thereof;
  a third device configured to determine that the electronic flash is obstructed when the first device determines that the image is under-exposed and the second device determines that the output of the electronic flash is not at its maximum; and
  a fourth device configured to determine that a flash of the electronic flash does not reach the subject responsive to the first device determining that the imaging device is under-exposed at the electronic flash shooting and the second device determining that the output of the electronic flash is at its maximum.

22. The electronic camera according to claim 21, further comprising a warning device configured to warn that the electronic flash is obstructed responsive to the third device determining that the electronic flash is obstructed, the warning device further configured to warn that the flash does not reach the subject when the fourth device determines that the flash does not reach the subject.

23. The electronic camera according to claim 21, wherein the second device determines whether the output of the electronic flash is at the maximum in accordance with at least one of: an emission time of the electronic flash and a change in voltage of a capacitor powering the electronic flash, the change in voltage determined between a first instant before the electronic flash shooting and a second instant after the electronic flash shooting.

24. The electronic camera according to claim 21, further comprising a warning device configured to warn that the electronic flash is obstructed when the third device determines that the electronic flash is obstructed and further configured to warn that the flash does not reach the subject when the fourth device determines that the flash does not reach the subject.

25. An electronic camera recording image data associated with an image of a subject captured through a taking lens and an imaging device into a recording medium, the electronic camera comprising:
  a first device configured to determine whether the image is under-exposed in accordance with the image data captured at a shooting of an electronic flash;
  a second device configured to determine whether an output of the electronic flash is at a maximum;
  a third device configured to determine that the electronic flash is obstructed when the first device determines that the image is under-exposed and the second device determines that the output of the electronic flash is not at its maximum; and
  a fourth device configured to determine that a flash of the electronic flash does not reach the subject when the first device determines that the image is under-exposed and the second device determines that the output of the electronic flash is at its maximum.

26. The electronic camera according to claim 25, further comprising a warning device configured to warn that the electronic flash is obstructed responsive to the third device determining that the electronic flash is obstructed.

27. The electronic camera according to claim 25, further comprising a correction device configured to correct an exposure level of the image data when the fourth device determines that the flash does not reach the subject, the correction device further configured to record the corrected image data in the recording medium.

28. The electronic camera according to claim 25, wherein the second device determines whether the output of the electronic flash is at the maximum in accordance with at least one of: an emission time of the electronic flash and a change in voltage of a capacitor powering the electronic flash, the change in voltage determined between a first instant before the electronic flash shooting and a second instant after the electronic flash shooting.

29. An electronic camera recording image data associated with an image of a subject captured through a taking lens and an imaging device into a recording medium, the electronic camera comprising:
  a first device configured to determine whether the image is under-exposed in accordance with the image data captured at an electronic flash shooting of an electronic flash;
  a second device configured to determine whether the subject distance measured by a rangefinder at the electronic flash shooting is within a predetermined reach of a flash; and
  a third device configured to determine that the electronic flash is obstructed responsive to the first device determining that the imaging device is under-exposed and the second device determining that the subject distance is within the predetermined reach of flash.

30. The electronic camera according to claim 29, further comprising a warning device configured to warn that the electronic flash is obstructed when the third device determines that the electronic flash is obstructed.

31. An electronic camera recording image data associated with an image of a subject captured through a taking lens and an imaging device into a recording medium, the electronic camera comprising:
  an electronic flash; and
  a processor coupled to the electronic flash, the processor configured to,
    determine whether the image is under-exposed in accordance with the image data captured at a shooting of the electronic flash;
    determine whether an output of the electronic flash is at a maximum; and
    determine that the electronic flash is obstructed responsive to determining that the image is under-exposed and responsive to determining that the output of the electronic flash is not at the maximum.

32. The electronic camera according to claim 31, wherein the processor, in determining whether the output of the electronic flash is at the maximum, is further configured to at least one of:
  determine an emission time of the electronic flash; and
  determine a change in voltage of a capacitor powering the electronic flash, the change in voltage determined between a first instant before the electronic flash shooting and a second instant after the electronic flash shooting.

33. An electronic camera recording image data associated with an image of a subject captured through a taking lens and an imaging device into a recording medium, the electronic camera comprising:

an electronic flash; and a processor coupled to the electronic flash, the processor configured to, determine whether the image is under-exposed in accordance with the image data captured at an electronic flash shooting;

determine whether an output of the electronic flash is at a maximum;

determine that a flash of the electronic flash does not reach the subject; and correct an exposure level of the image data responsive to determining that the imaging device is under-exposed and responsive to determining that the output of the electronic flash is at the maximum.

34. The electronic camera according to claim 33, wherein the processor, in determining whether the output of the electronic flash is at the maximum thereof, is further configured to at least one of:

determine an emission time of the electronic flash; and determining a change in voltage of a capacitor powering the electronic flash, the change in voltage determined between a first instant before the electronic flash shooting and a second instant after the electronic flash shooting.

35. An electronic camera recording image data associated with an image of a subject captured through a taking lens and an imaging device into a recording medium, the electronic camera comprising:

an electronic flash; and a processor coupled to the electronic flash, the processor configured to, determine whether the image is under-exposed in accordance with the image data captured at an electronic flash shooting;

measure a distance from the electronic camera to the subject, determine whether the distance is within a predetermined reach of the electronic flash; and determine that the electronic flash is obstructed responsive to determining that the image is under-exposed and responsive to determining that the distance is within the predetermined reach of the electronic flash.

* * * * *